Oct. 16, 1928.
F. R. KLAUS
1,688,146
DEMOUNTABLE RIM STRUCTURE
Original Filed July 3, 1925   2 Sheets-Sheet 1
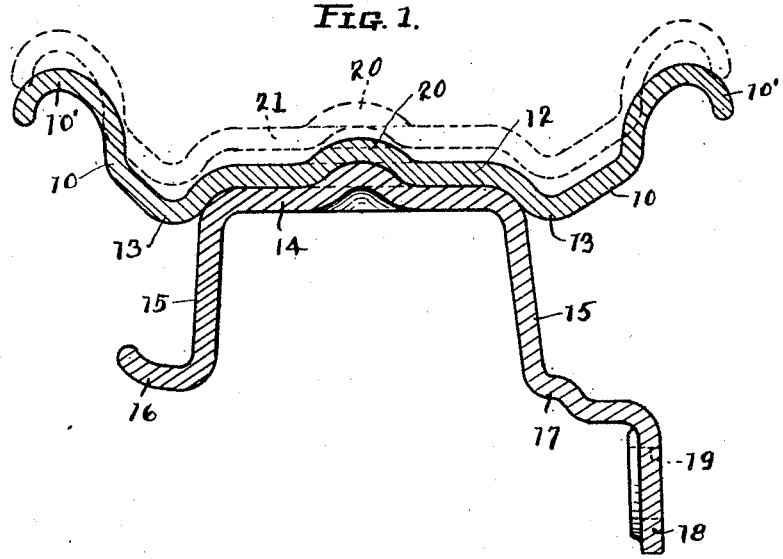
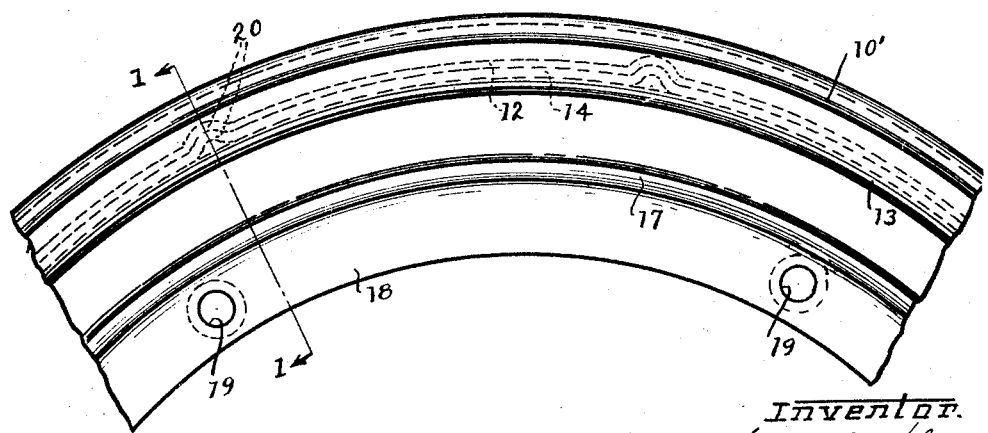
Inventor.
Fred R. Klaus
Evans & McCoy
Attorneys.

Oct. 16, 1928.

F. R. KLAUS 1,688,146

DEMOUNTABLE RIM STRUCTURE

Original Filed July 3, 1925    2 Sheets-Sheet 2

Inventor.
Fred R. Klaus
Evans & McCoy
Attorneys.

Patented Oct. 16, 1928.

1,688,146

UNITED STATES PATENT OFFICE.

FRED R. KLAUS, OF WARREN, OHIO, ASSIGNOR TO THE AMERICAN WELDING AND MANUFACTURING COMPANY, OF WARREN, OHIO, A CORPORATION OF OHIO.

DEMOUNTABLE-RIM STRUCTURE.

Original application filed July 3, 1925, Serial No. 41,249. Divided and this application filed November 18, 1926. Serial No. 149,093.

This invention relates to demountable rim structures for carrying a rubber tire and is a division of my co-pending application Serial No. 41,249 that was filed on July 3, 1925.

An object of my invention is to provide a demountable rim structure which is formed to carry a tire of desired section and interior diameter upon a given or standard wheel of considerably smaller diameter than the tire.

Another object of my invention is to provide a unitary demountable rim structure which includes an adapter ring section for supporting a tire carrying section in desired spaced relation from a wheel so as to accommodate a tire of large diameter upon a wheel of relatively small diameter.

Another object of my invention is to provide a rim assembly of the type set forth in the above objects which is of a simple design and which can be manufactured cheaply.

These and other objects will apear more fully in the following specification taken with the accompanying drawings, wherein is illustrated embodiments of my invention.

In the drawings, Figure 1 is a cross sectional view taken on line 1—1 of Fig. 2, showing a rim structure embodying my invention, the rim element being shown in dotted lines to illustrate its form prior to the operation for shrinking it upon the adapter ring;

Fig. 2 is a side elevation of a section of the assembled rim structure;

Figure 3:
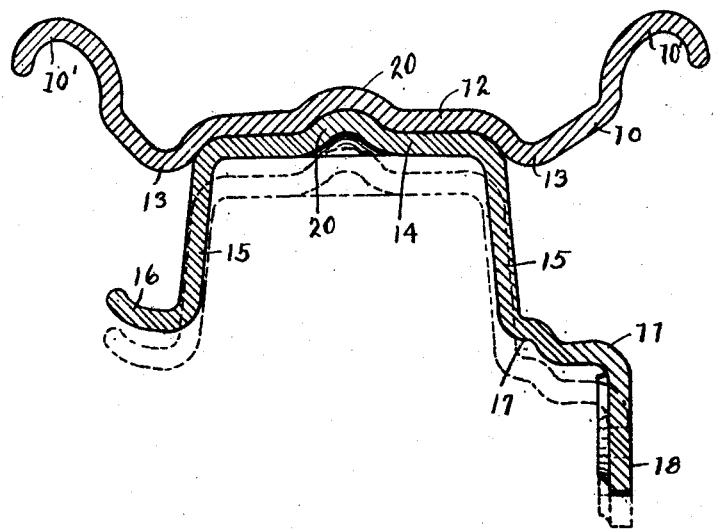
Fig. 3 is a sectional view of a rim structure similar to Fig. 1, the adapter ring in this form being shown in dotted lines illustrating its form prior to the operation expanding it against the rim section.

Referring now to the drawings by characters of reference, 10 represents a tire carrying rim section and 11 an adapter ring section which are secured together to form an assembled unitary rim structure. The two sections comprising the rim structure are formed of rolled metal stock and are preferably of uniform cross section respectively. The sections illustrated are formed as continuous annular structures, but it will be understood that they could be formed in various other ways and still come within the scope of the spirit of my invention.

The metal tire carrying rim section is formed to provide a base portion, the central portion 12 of which extends transversely and the side portions 13 of which are bent interiorly and then outwardly and terminate in outwardly curved annular tire retaining flanges 10'. The base portion of this rim section is of such a width that it can receive a cushion tire of large section and diameter, or a pneumatic tire of large diameter which may be of a low air pressure, or balloon type.

The adapter ring section 11 is formed with a base portion 14 having annular side walls 15 extending interiorly therefrom at a slight angle greater than that of a vertical plane. One of the side walls terminates in an outwardly extending flange 16 which provides a bearing surface for engaging the fixed rim of a wheel. The other side extends interiorly a greater length than the wall flange 16, and is curved outwardly to provide an annular flange 17 for engaging the fixed rim of a wheel. The flange 17 terminates in an interiorly bent portion 18 which is provided with a plurality of apertures 19, to receive bolts for securing the rim structure to the wheel. The side walls are of different lengths so that the bearing surfaces of the flanges will engage with the fixed rim of a wheel having beads or portions of different diameters to permit the rim structure to be readily mounted and demounted.

It will be seen that the side walls of the adapter ring are of such length that the rim section of the rim structure will be spaced a considerable distance exteriorly from the bearing surfaces which engage the wheel. It will also be observed that the width of the base portion of the rim section is equal to the distance between the outer portions of the bearing flanges of the adapter ring section. With my structure, therefore, tires of large diameter and cross section can be supported upon a wheel of small diameter and such arrangement is especially desirable to adapt cushion, or balloon, tires upon wheels which are designed to carry tires of a smaller diameter and cross section.

I prefer to secure the rim and adapter sections together as a unit in the manner which I will now describe. The rim section 12 and the adapter section 11 are first formed of different diameters so that the adapter section can be inserted inside the rim section 12 and between the depending portions 13 of the rim base. The diameter of one of the sections is then changed so that the rim section and the adapter section are in close contact throughout their peripheries. This process can consist of either shrinking the rim section or expanding the adapter section, or both. It will be seen that when the adjacent diameters of the base portions of the sections are similar, the interiorly depending portions 13 of the rim base will extend downwardly over the side walls and thus prevent relative lateral movement of the sections. The rim section and the adapter section are preferably provided with a plurality of outwardly pressed protuberances 20 which extend exteriorly from the outer surface of the base portions of these sections. When the base portions of the sections are in engagement the protuberances of the adapter section will fit within those in the rim section and prevent any relative circumferential movement of the sections, thus forming driving lugs or buttons. It will be obvious, however, that such driving connections may be made by rivets or any other suitable means. Preferably the protuberances 20 are formed when one of the members is shrunk or stretched in the assembly operation, but it is obvious, of course, that if desired they can be formed in the sections previous to assembly.

In Fig. 1 I have illustrated one method of assembling the sections, the rim section 21 being shown in dotted lines in its original form which is of larger internal diameter than the external diameter of the adapter section. In this instance the rim section is shrunk while cold, in the well known manner until it fits tightly against the adapter section as shown in full lines.

In Fig. 2 I have illustrated another method of assembling the sections. The adapter section in this instance, as shown in dotted lines indicated by 22, is formed of smaller external diameter than the interior of the rim section. In this instance the adapter section is expanded while cold, until it fits tightly against the rim section.

Figure 4:
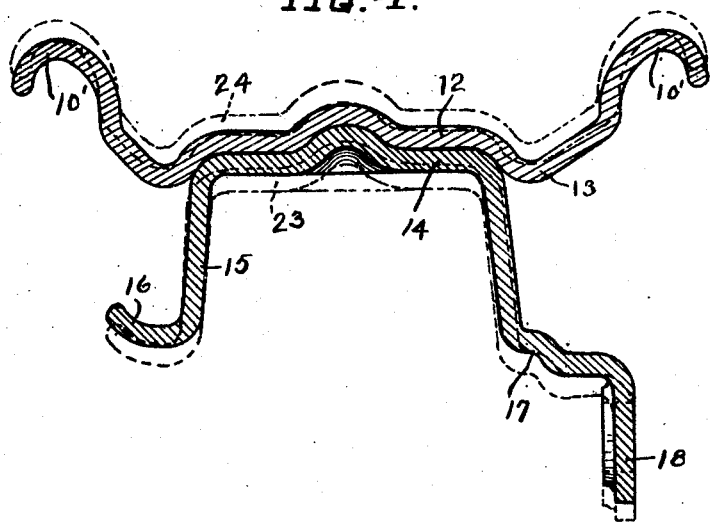
Fig. 4 is a cross section of a rim assembly of the form shown in Fig. 1, in which both the rim is shrunk and adapter is expanded in assembling, their original form being shown in dotted lines.

In Fig. 4 I have shown another method of assembling the sections. In this instance the rim section is indicated in dotted lines at 23 in its original form, and the adapter section is indicated in dotted lines at 24 in its original form. In this instance the rim section is shrunk and the adapter section is expanded until their adjacent base faces tightly engage as shown in full lines.

It will be seen that I have provided a simple form of structure which consists of two pieces which can be readily assembled and cheaply manufactured.

It will also be seen that the rim section can be formed of a width and diameter to carry any given form of tire, and that such rim can be adapted to a wheel of a given diameter by forming the adapter ring side walls the requisite length to support the rim section upon the wheel. In this manner a tire of any section and diameter can be adapted to a given or standard wheel of smaller diameter.

Various changes can be made in the structure and manner of assembling the same as described above without departing from the spirit of my invention and the scope of what is claimed.

What I claim is:

1. The process of forming a metal rim structure that consists in separately forming an annular tire carrying metal rim having a circumferential depression intermediate its side edges on the interior thereof and an annular adapter ring of sufficiently small diameter to be received within said rim, and of a width to fit in said depression, assembling said adapter ring within the rim and changing the diameter of at least one of said parts to cause the outer seating face of the adapter ring to become tightly engaged in the depression of said rim.

2. The process of forming a metal structure for supporting a vehicle tire that consists in separately forming an endless annular tire rim and an endless annular adapter ring of smaller diameter than said rim and adapted to be received therein, assembling the rim and adapter ring by simultaneously shrinking the rim and expanding the adapter ring until the parts are rigidly engaged.

3. The process of forming a tire supporting structure for mounting a tire on a vehicle wheel of relatively small diameter which consists in separately forming an endless annular tire carrying rim having a circumferential depression on the interior thereof, forming an endless adapter ring of smaller diameter and of a width to fit in said depression, said ring being of channel form with inwardly extending flanges, assembling the rim on the adapter ring and expanding the adapter ring radially outward into said depression of the rim.

In testimony whereof I hereunto affix my signature.

FRED R. KLAUS.